United States Patent
Kempen et al.

[19]

[11] Patent Number: 6,014,215
[45] Date of Patent: Jan. 11, 2000

[54] SELF-REFERENCING INTERFEROMETRIC FIBER OPTIC SENSOR SYSTEM HAVING A TRANSDUCER MECHANISM WITH A POSITION REFERENCE REFLECTOR

[75] Inventors: Lothar U. Kempen, Redondo Beach; John D. Prohaska; Robert A. Lieberman, both of Torrance, all of Calif.

[73] Assignee: Physical Optics Corporation, Torrance, Calif.

[21] Appl. No.: 09/059,872

[22] Filed: Apr. 14, 1998

[51] Int. Cl.[7] ........................................................ G01B 9/02
[52] U.S. Cl. ............................................. 356/345; 356/357
[58] Field of Search ...................................... 356/345, 357, 356/355, 35.5; 250/227.19, 227.27; 385/12, 14

[56] References Cited

U.S. PATENT DOCUMENTS

| | | |
|---|---|---|
| 4,596,466 | 6/1986 | Ulrich . |
| 4,678,909 | 7/1987 | Jackson et al. . |
| 5,094,534 | 3/1992 | Cole et al. . |
| 5,321,501 | 6/1994 | Swanson et al. ........................ 356/345 |
| 5,323,229 | 6/1994 | May et al. . |
| 5,381,231 | 1/1995 | Tu .......................................... 356/345 |
| 5,517,303 | 5/1996 | Cole et al. . |
| 5,596,409 | 1/1997 | Marcus et al. ........................... 356/357 |
| 5,721,615 | 2/1998 | McBride et al. ......................... 356/345 |

OTHER PUBLICATIONS

Absolute optical ranging using low coherence interferometry, Danielson et al, Aplied Optics, Jul. 1991, pp. 2975–2979.

"Prototype fiber–optic–based pressure probe with built–in temperature compensation with signal recovery by coherence reading, " Rao, Y. J.; Jackson, D.A., *Applied Optics*, vol. 32, No. 34, Dec. 1, 1993, p. 7110–13.

"Fiber–optic pressure sensors for internal combustion engines," Atkins, R. A.; Gardner, J. H.; Gibler, W. N.; Lee, C. E.; Oakland, M. D.; Spears, M. O.; Swenson, V. P.; Taylor, H. f.; McCoy, J. J.; Beshouri, G., *Applied Optics*, vol. 33, No. 7, Mar. 1, 1994, p. 1315–20.

"Novel technique of interferometric option fiber sensing, "Shelyakov, Alexander V.; Rzhavin, Yuri I., *Proceedings of SPIE—The International Society for Optical Engineering*, vol. 2349, Society of Photo–Optical Instrumentation engineers, 1995, p. 154–57.

"White–light interferometric fiber–optic pressure sensor," Bock, Wojtek, J.; Urbanczyk, Waclaw; Wojcik, Jan; Beaulieu, Mario, *IEEE Transactions on Instrumentation and Measurement*, vol. 44, No. 3, Jun. 1995, p. 694–97.

*Primary Examiner*—Samuel A. Turner
*Attorney, Agent, or Firm*—Nilles & Nilles, S.C.

[57] ABSTRACT

A fiber optic sensor system comprises an optical fiber, a first reflector and a second reflector. The first reflector provides a fixed reference for measuring the optical path length between the second reflector and a reference reflector. The first and second reflectors respectively receive first and second portions of light emitted by the optical fiber and then reflect the light back to the optical fiber. The optical path length between the first and second reflectors varies in accordance with a sensed parameter. In operation, first and second interferograms are acquired that are produced by the interference of light reflected from the first and second reflectors with light reflected from a reference reflector. The first and second interferograms are then used to determine an optical path length between first and second reflectors. Finally, the optical path length between the first and second reflectors is used to determine the value of the sensed parameter.

26 Claims, 5 Drawing Sheets

SELF-REFERENCING INTERFEROMETRIC FIBER OPTIC SENSOR SYSTEM HAVING A TRANSDUCER MECHANISM WITH A POSITION REFERENCE REFLECTOR

BACKGROUND OF THE INVENTION

1. Field of the Invention

This invention relates to interferometric fiber optic sensor systems, and in particular relates to interferometric fiber optic sensor systems that are self-referencing. In a particularly preferred embodiment, the present invention relates to a self-referencing interferometric fiber optic sensor that is usable for measuring pressure.

2. Description of Related Art

Various types of sensor systems that utilize fiber optic technology are known. Such systems include systems in which a transducer mechanism is coupled to an optical fiber, as well as systems in which a transducer mechanism is incorporated into the optical fiber itself.

One example of a parameter that has been measured using a fiber optic sensor is fluid pressure. For example, according to one known arrangement, optical fibers are used to construct an interferometric system that monitors the position of a test mirror in order to provide an indication of pressure. The test mirror serves as a transducer mechanism and is movable in accordance with a pressure applied to one side of the mirror. In operation, light having a long coherence length is delivered from a light source (typically a laser) into a first optical fiber. The light travels through the optical fiber to a coupler. One portion of the light that is output from the coupler travels through a second optical fiber to a reference mirror, and then returns through the second optical fiber to the coupler. Another portion of the light output from the coupler travels through a third optical fiber to the test mirror and then returns through the third optical fiber to the coupler. At the coupler, constructive and destructive interference occurs between the light reflected from the reference mirror and the light reflected from the test mirror, depending on the position of the test and reference mirrors relative to the coupler. The interference is detected by a photodetector, which receives the interference from the coupler through a fourth optical fiber. The position of the mirror is then determined by monitoring the occurrence of interference fringes, one fringe corresponding to one-half wavelength of movement of the test mirror. To obtain pressure, the displacement of the mirror is multiplied by the spring constant of the mounting fixture for the test mirror and divided by the area of the mirror.

The advantage of interferometric fiber optic sensor systems is that they are very precise. For example, in the pressure measurement system just described, displacement of the test mirror on the nanometer scale may be detected.

In practice, however, difficulty has been encountered in fully exploiting the potential of interferometric fiber optic sensor systems. The optical paths between the coupler and the test and reference mirrors are affected differently over time by such factors as temperature variations, vibrations, optical fiber bending, and variations in refractive indices. These variations reduce the precision that can be achieved, because they introduce optical path length differences that are not caused by movement of the test mirror.

Additionally, in the context of pressure measurement systems of the above-described type, another difficulty that has been encountered is that such systems only provide only relative position information. Monitoring interference fringes only provides information about the movement of the test mirror, and not about its absolute position. Therefore, information about a previous position of the test mirror is always required in order to provide information about the current position of the test mirror. This allows for the development of accumulated error.

Thus, what is needed is an interferometric fiber optic sensor system that is relatively insensitive to variations in temperature, vibrations, optical fiber bending, and variations in refractive indices between the test and reference paths. In the context of pressure sensor systems, what is also needed is a system that allows absolute measurements of the position of a test mirror serving as a transducer mechanism to be made.

BRIEF SUMMARY OF THE INVENTION

The present invention overcomes these drawbacks of the prior art. Specifically, in accordance with one aspect of the invention, the present invention provides a method of sensing changes in optical path length in which first and second interferograms are acquired. The first interferogram is produced by the interference of light reflected from a first reflector with light reflected from a reference reflector. The second interferogram is produced by the interference of light reflected from a second reflector with light reflected from the reference reflector. The optical path length difference between the second reflector and the reference reflector varies in accordance with a sensed parameter. The first and second interferograms are used to determine an optical path length between the first and second reflectors. The optical path length between the first and second reflectors is then used to determine the value of the sensed parameter.

The second test reflector may be movable. In this case, the optical path length difference between the second reflector and the reference reflector varies as the second test reflector moves. Alternatively, the second test reflector may also be fixed. In this case, the optical path length difference between the second reflector and the reference reflector varies as the index of refraction of an optical medium between the first and second test reflectors varies. A combination of the two approaches may also be utilized.

In accordance with another aspect of the invention, the present invention provides a fiber optic sensor system comprising a low coherence length illumination source, a coupler, a reference reflector, first and second test reflectors, a photodetector, and a signal processing unit.

The coupler is coupled to the low coherence length illumination source by way of a first optical fiber. The reference reflector is coupled to the coupler by way of a second optical fiber. The first and second test reflectors are coupled to the coupler by way of a third optical fiber. The photodetector is coupled to the coupler by way of a fourth optical fiber, and the signal processing unit is electronically coupled to the photodetector.

An optical path length difference between the second test reflector and the reference reflector varies in accordance with a sensed parameter. The signal processing unit determines the value of the sensed parameter by determining an optical path length between the first and second test reflectors. In a particularly preferred embodiment, the signal processing unit uses first and second interferograms, which are respectively produced using light reflected from the first and second test reflectors, to determine the optical path length between the first and second test reflectors.

Advantageously, therefore, the sensor system is self-referencing. The provision of an additional reflector provides a reference for measuring the optical path length difference between the test reflector and the reference reflector. This makes the sensor relatively insensitive to variations in temperature, vibrations, optical fiber bending, and variations in refractive indices between the test and reference paths. Disturbances caused by such variations tend to cancel because they appear in two different measurements that are then subtracted. Additionally, the pressure sensor system allows absolute measurements of the position of the test mirror to be made.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 1:
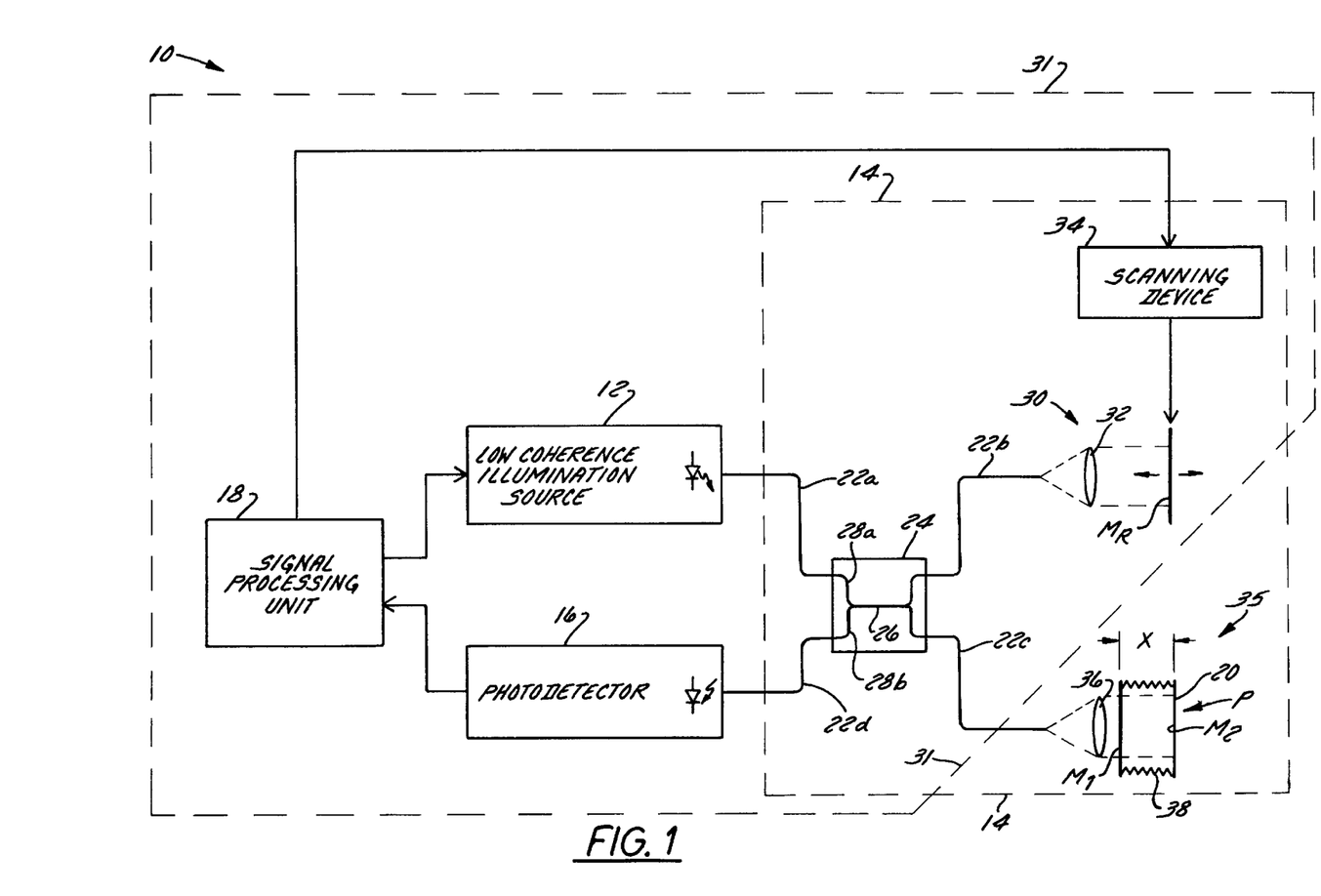
FIG. 1 is a schematic view of a self-referencing, interferometric fiber optic sensor system according to an embodiment of the present invention.

Referring now to FIG. 1, a schematic view of a self-referencing, interferometric fiber optic sensor system 10 according to one embodiment of the present invention is illustrated. The system 10 is particularly adapted to measuring pressure. As will become more apparent below, however, the present invention can also be advantageously applied to other types of sensor systems.

By way of overview, the system 10 comprises an illumination source 12, an interferometer 14, a photodetector 16 and a signal processing unit 18. The system 10 is used to detect the magnitude of a pressure P applied against a transducer surface 20 of the interferometer 14.

The illumination source 12 produces light that is delivered to the interferometer 14. The illumination source 12 is preferably a low coherence length source such as a broadband light emitting diode. The interferometer 14 further comprises a plurality of optical fibers 22a–22d. The optical fiber 22a forms an optical link between the illumination source 12 and an optical coupler 24, the optical fiber 22b forms an optical link between the optical coupler 24 and a reference mirror assembly 30, the optical fiber 22c forms an optical link between the optical coupler 24 and a test mirror assembly 35, and the optical fiber 22d forms an optical link between the optical coupler 24 and the photodetector 16.

In practice, the elements within the dashed line 31 are located together at a local end of the optical fiber 22c, and the test mirror assembly 35 (which is shown as being outside of the dashed line 31) is remotely located at an opposite end of the optical fiber 22c. The optical fiber 22c may be as much as one kilometer in length, and perhaps even more. The optical fiber 22b is wound on a spool or other suitable structure so that it may be as long as the optical fiber 22c while still being contained within the same housing as the remaining elements within the dashed line 31.

The light produced by the illumination source 12 is transmitted through the optical fiber 22a to the optical coupler 24. The optical coupler 24 contains a region 26 in which portions 28a and 28b of the fibers 22a–22d are fused together. In particular, the optical fibers 22a and 22b may be formed of one continuous optical fiber, part of which forms the optical fiber 22a and part of which forms the optical fiber 22b. This continuous optical fiber could then be fused somewhere along its length to another continuous optical fiber, part of which forms the optical fiber 22c and part of which forms the optical fiber 22d. Alternatively, the optical fibers 22a–22d could all be distinct optical fibers that are fusion spliced to various fiber optic leads of the optical coupler 24.

The optical coupler 24 serves as a beam splitter in the interferometer 14 and splits the light received from the illumination source 12 into two preferably equal portions. A first portion of the light travels through the optical fiber 22b and is delivered to the reference mirror assembly 30. The reference mirror assembly comprises a lens 32, a mirror or other reflector $M_R$, and a scanning device 34. The lens 32 collimates the light coming out of the optical fiber 22b. The scanning device 34 is operable to vary the position of the mirror $M_R$ with respect to the end of the optical fiber 22b and therefore to vary the optical path distance traveled by the light reflected by the mirror $M_R$. Thus, the optical path distance traveled by the light reflected by the mirror $M_R$ could also be varied in other ways besides moving the reference mirror $M_R$, for example, by using photoelastic effects, acousto-optic effects, or electro-optic effects. The light in the optical fiber 22b reflects from the mirror $M_R$ and returns to the optical coupler 24 by way of the optical fiber 22b.

A second portion of the light travels through the optical fiber 22c and is delivered to the test mirror assembly 35, which comprises a lens 36, a reflector $M_1$ and a reflector $M_2$. The reflector $M_1$ is preferably a semi-transparent mirror and the reflector $M_2$ is preferably a purely reflective mirror. Therefore, one portion of the light that travels through the optical fiber 22c is reflected by the semi-transparent mirror $M_1$ and returns directly to the optical fiber 22c, whereas another portion of the light is transmitted through the semi-transparent mirror $M_1$ to the reflector $M_2$. The mirror $M_2$ then reflects nearly all of the light that is not reflected back to the optical fiber 22c by the semi-transparent mirror $M_1$. The back side of the mirror $M_2$ (i.e., the side that does not reflect light from the source 12) forms, or is mechanically coupled to, the previously-mentioned transducer surface 20 that has the pressure P applied thereto. The mirror $M_2$ is movably mounted within the assembly 35 by way of a spring mechanism 38. The spring mechanism 38 receives energy from the system under test when pressure increases, and transfers that stored energy back to the system under test when pressure decreases. The transducer mechanism in this embodiment therefore comprises the mirror $M_2$ and the spring mechanism 38. Alternatively, the mirror $M_2$ could be a thin reflective diaphragm that deforms under the influence of pressure P, thus eliminating the need for spring mechanism 38 in which case the transducer mechanism comprises the mirror $M_2$ that is capable of deforming under pressure.

Once the light that reflects from the mirrors $M_1$ and $M_2$ returns to the optical fiber 22c, it is transmitted to the optical coupler 24 where it constructively and destructively interferes with light reflected from the mirror $M_R$. The optical coupler 24 again splits the interference light into two preferably equal portions, one of which is directed toward the source 12 along the optical fiber 22a, and the other of which is directed toward the photodetector 16 along the optical fiber 22d. The interference light that is directed toward the source 12 is lost and is not utilized.

The remainder of the interference light is detected by the photodetector 16. The output of the photodetector 16 is received by the signal processing unit 18. The signal processing unit 18 could, for example, be an analog signal processor, a digital signal processor, a computer, or any other signal processing unit. As detailed below in conjunction with FIGS. 2–3, the signal processing unit 18 interprets the output of the photodetector 16 in order to determine the magnitude of the pressure P that is applied to the transducer surface 20.

Figure 2:
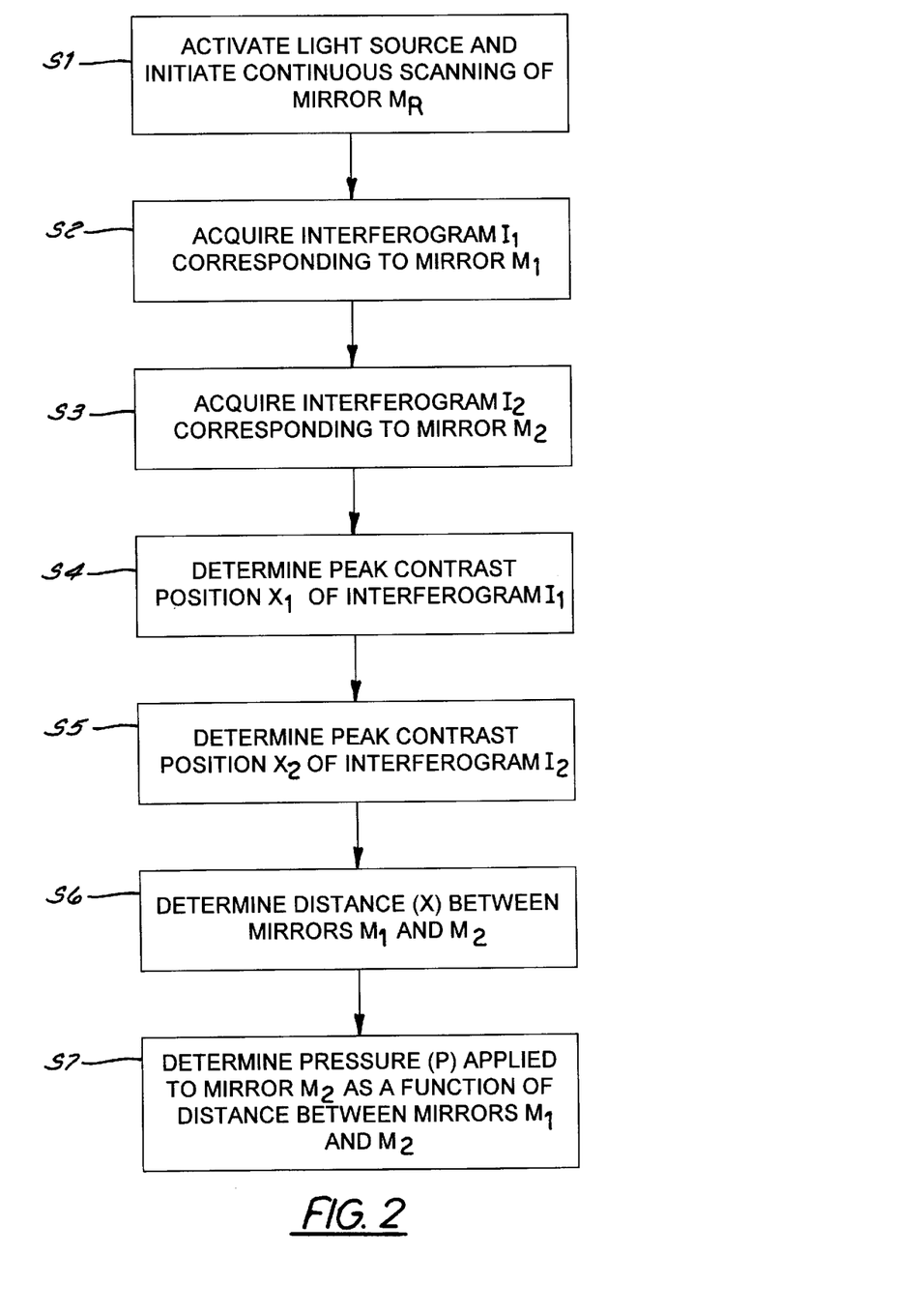
FIG. 2 is a flow chart showing the operation of the system of FIG. 1.
Figure 3:
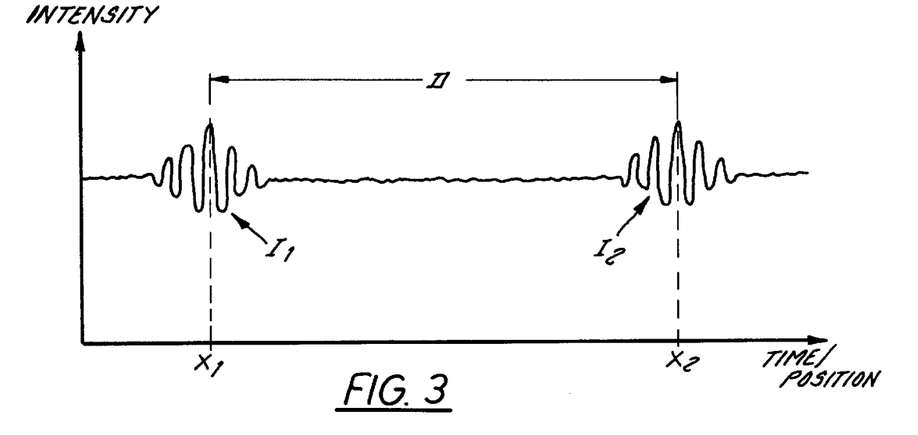
FIG. 3 a graph showing two interferograms acquired during the process illustrated by the flow chart of FIG. 2.

Referring now also to FIGS. 2 and 3, the operation of the system 10 to determine pressure is described in greater detail. FIG. 2 is a flow chart showing the operation of the system of FIG. 1, and FIG. 3 is a graph showing two interferograms $I_1$ and $I_2$ acquired during the process illustrated by the flow chart of FIG. 2.

At step S1, the illumination source 12 is activated and continuous scanning of the mirror $M_R$ is initiated. The scanning of the mirror $M_R$ produces interference that varies as a function of scan position. The interference is interference between light reflected from the mirror $M_R$ and light reflected from one of the mirrors $M_1$ and $M_2$, and has an intensity that varies depending on the extent to which the interference is constructive or destructive. FIG. 3, which has an x-axis defined both in terms of reference mirror $M_R$ position and in terms of time, assumes the mirror $M_R$ is scanned through the range of positions linearly with time. Alternative scan rates are also possible.

At steps S2–S3, the first and second interferograms $I_1$ and $I_2$ are acquired by the photodetector 16. The interferograms $I_1$ and $I_2$ are produced at different times during the scanning of the scanning device 34, corresponding to different sequences of scan positions. As is known, an interferogram has a periodic intensity variation as a function of optical path length difference due to the interference between light reflected from two reflectors and having a coherence envelope with a width that depends on the spectral characteristics of the illumination source and the reflectors. The interferogram $I_1$ is produced by constructive and destructive interference of the light reflected from the mirror $M_1$ with light reflected from the mirror $M_R$. The interferogram $I_2$ is produced by constructive and destructive interference of the light reflected from the mirror $M_2$, with light reflected from the mirror $M_R$.

The interferograms $I_1$ and $I_2$ each have a single, well-defined contrast peak at the positions $X_1$ and $X_2$, respectively, as illustrated in FIG. 3. This is the result of using a low coherence length illumination source. It is important to use a low coherence illumination source in order to avoid constructive and destructive interference between the light reflected from the mirror $M_1$ and the light reflected from the mirror $M_2$. A low coherence illumination source is an illumination source having a coherence length that is at least one order of magnitude lower than the scanning range of the reference mirror $M_R$. If a long coherence length illumination source is used, the light from the mirrors $M_1$ and $M_2$ may constructively and destructively interfere, thereby hampering or rendering impossible determination of the positions of the mirrors $M_1$ and $M_2$.

At step S4, a peak contrast position $X_1$ of the interferogram $I_1$ is determined. The peak contrast position $X_1$ occurs at a scan position in which the optical path distance of the light reflected by the mirror $M_R$ is equal to the optical path distance of the light reflected by the mirror $M_1$. Thus, the peak contrast position $X_1$ is a position of the reference mirror $M_R$ that corresponds to the position of the mirror $M_1$.

At step S5, a peak contrast position $X_2$ of the interferogram $I_2$ is determined. The peak contrast position $X_2$ occurs at a scan position in which the optical path distance of the light reflected by the mirror $M_R$ is equal to the optical path distance of the light reflected by the mirror $M_2$. Thus, the peak contrast position $X_2$ is a position of the reference mirror $M_R$ that corresponds to the position of the mirror $M_2$.

At step S6, the optical path length between the mirrors $M_1$ and $M_2$ is determined. The optical path length between the mirrors $M_1$ and $M_2$ can be determined simply by taking the difference of the path lengths $X_1$ and $X_2$:

$$X = X2 - X1 \tag{1}$$

where X is the optical path length between the mirrors $M_1$ and $M_2$, $X_1$ is the position of the reference mirror $M_R$ that corresponds to the position of the mirror $M_1$, and $X_2$ is the position of the reference mirror $M_R$ that corresponds to the position of the mirror $M_2$.

step S7, the pressure applied to the mirror $M_2$ is determined. Since the displacement of the mirror $M_2$ is known, the total force applied can be determined by straightforward application of Hooke's law:

$$F = k(X_0 - X) \tag{2}$$

where F is the force applied to the mirror $M_2$, k is the spring constant of the spring mechanism 38, X is the distance between the mirrors $M_1$ and $M_2$, and $X_0$ is a positional offset, defined such that Eq. (2) yields F=0 when no force is applied to the spring. In practice, the definition of the displacement factor $(X_0-X)$, and in particular the offset $X_0$, will vary depending on the precise manner in which the mirror $M_2$ is mounted and the location of the spring mechanism 34 with respect to the mirror $M_1$. In order to determine pressure, the force determined by Eq. (2) is divided by the area of the mirror.

$$P = F/A \tag{3}$$

where P is the pressure applied to the mirror $M_2$, F is defined in Eq. (1), and A is the portion of the area of the mirror $M_2$ to which force is applied. Of course, the steps required to perform the Equations (2) and (3) could be done in a single computation.

Figure 4:
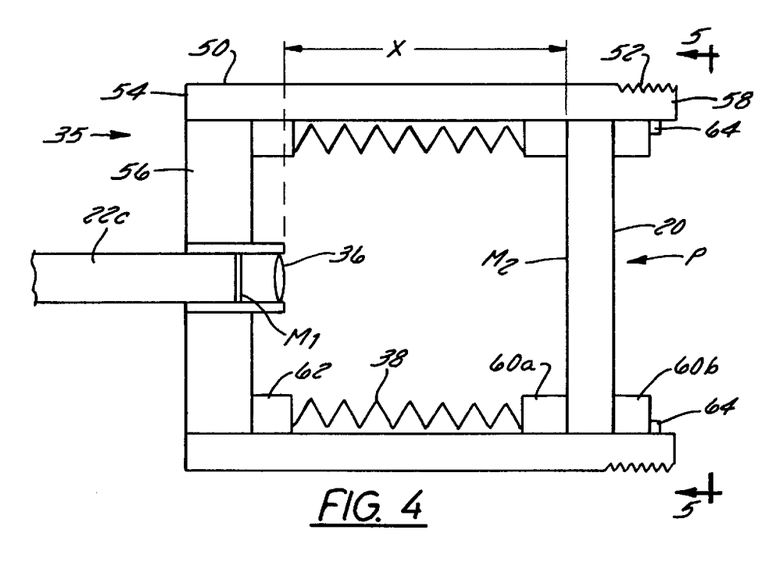
FIG. 4 a side cross section view of a test mirror assembly that can be used in the system of FIG 1.
Figure 5:
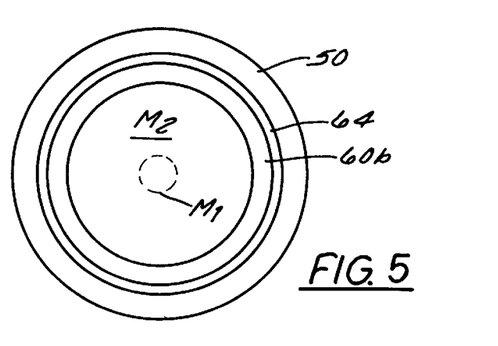
FIG. 5 an end cross section view of the test mirror assembly, taken along the lines 5—5 in FIG. 4.

Referring now also to FIGS. 4 and 5, cross section views of a particularly preferred embodiment of the assembly 35 are illustrated. The assembly 35 has a generally tube-shaped housing, preferably comprising a pipe 50 having threads 52. The pipe 50 can, for example, be about one inch in diameter or less. The threads 52 permit the assembly 35 to be mounted within a fluid system so that the fluid pressure at a particular location within the fluid system may be determined.

The optical fiber enters the pipe 50 at a first longitudinal end 54 thereof. A flange 56 holds the optical fiber and the lens 36 within the pipe 50. In the preferred embodiment, the mirror $M_1$ is provided in the form of a metal coating that is deposited on an end surface of the optical fiber 22c. (In this embodiment, therefore, the mirror $M_1$ is on an opposite side of the lens 36 as the mirror $M_2$, which is different than the embodiment illustrated in FIG. 1.) This coating could, for example, be a 500 angstrom coating of aluminum, gold, or silver. The mirror $M_1$ could also be formed on the lens 36. In either case, the mirror $M_1$ is semi-transparent, as previously noted.

The mirror $M_2$ is provided in the form of a piston at a second, opposite longitudinal end 58 of the pipe 50. As previously noted, the mirror $M_2$ is movable within the pipe $M_2$. For this purpose, inner and outer circular ring seals 60a and 60b are provided that permit the mirror $M_2$ to move without leakage. The mirrors $M_1$ and $M_2$ are both concentrically mounted within the housing 50 and are concentric with respect to each other.

The mirror $M_2$ is urged inwardly (toward the first longitudinal end 54) by the pressure P applied to the transducer surface 20. In equilibrium, an equal but oppositely oriented force is applied by the spring mechanism 38 having the spring constant k. The spring mechanism 38 could comprise, for example, a series of coil springs that are disposed about the inner perimeter of the pipe 50 or could be a corrugated cylindrical bellows made of spring metal. The spring mechanism 38 is disposed between the inner ring seal 60a and a fixed stop 62 that is disposed at the first longitudinal end 54 of the pipe 50 against the flange 56. The outward movement of the mirror $M_2$ is limited by a circular stop 64.

In operation, light is transmitted to the test mirror assembly 35 from the illumination source 12 by the optical fiber 22c. This light is emitted from the end of the optical fiber 22c. A first portion of the light is immediately reflected back into the optical fiber 22c by the mirror $M_1$. The reflected first portion of the light then returns to the optical coupler 24 where it constructively and destructively interferes with light reflected by the reference mirror $M_R$ as the mirror $M_R$ is scanned by the scanning device 34. The interference produces the first interferogram $I_1$.

The second portion of the light is transmitted through the mirror $M_1$ and the lens 36 to the mirror $M_2$. The second portion of the light is then reflected by the mirror $M_2$ and re-transmitted through lens 36 and the mirror $M_1$ (this time, in the opposite direction) whereafter it returns to the optical fiber 22c. The reflected second portion of the light is then transmitted to the optical coupler 24 where it constructively and destructively interferes with light reflected by the reference mirror $M_R$ as the mirror $M_R$ is scanned by the scanning device 34. The interference produces the second interferogram $I_2$.

As the amount of pressure that is applied to the transducer surface 20 increases, the spring mechanism 38 compresses and permits the mirror $M_2$ to move longitudinally toward the end 54 of the housing 50. The spring mechanism 38 reaches an equilibrium position in which the force applied by the spring mechanism 38 is equal but opposite to the force applied by the pressure that is being measured. At this point, the mirror $M_2$ does not move further. An opposite effect occurs as the amount of pressure applied to the transducer surface 20 decreases. The mirror $M_1$ always remains at the same position within the housing 50, therefore, the spacing between the mirrors $M_1$ and $M_2$ varies according to the amount of pressure applied to the transducer surface 20 of the mirror $M_2$.

Additionally, because the mirror $M_1$ always remains at the same position within the housing 50, the optical path length difference between the mirror $M_1$ and the mirror $M_R$ is substantially insensitive to variations in the sensed pressure. This permits the mirror $M_1$ to be a position reference against which the optical position of the mirror $M_2$ can be compared. In the assembly 35 of FIGS. 4 and 5, changes in the optical position of the mirror $M_2$ are caused by changes in the physical distance between the mirrors $M_1$ and $M_2$. As will be seen below in connection with the embodiment of FIG. 7, changes in the optical position of the mirror $M_2$ can also be caused by changes in the index of refraction of the material which is disposed between the mirrors $M_1$ and $M_2$.

In the sensor system 10 of FIG. 1, the scanning device 34 moves the mirror $M_R$ in order to vary the optical path length for the light that travels through the optical fiber 22b. As the mirror $M_R$ moves, it is important to accurately monitor the change in the position of the mirror $M_R$ so that an accurate indication of the optical path length difference between the mirrors $M_1$ and $M_2$ may be obtained. Conventionally, the monitoring of the movement of a reference mirror that is moved by a scanning device is accomplished through the use of a stepper motor or other high precision mechanical device in the scanning device. In practice, however, such high precision devices tend to be relatively expensive, and therefore it would be highly advantageous if an alternative way of monitoring the change in the position of the mirror $M_R$ could be provided.

Figure 6:
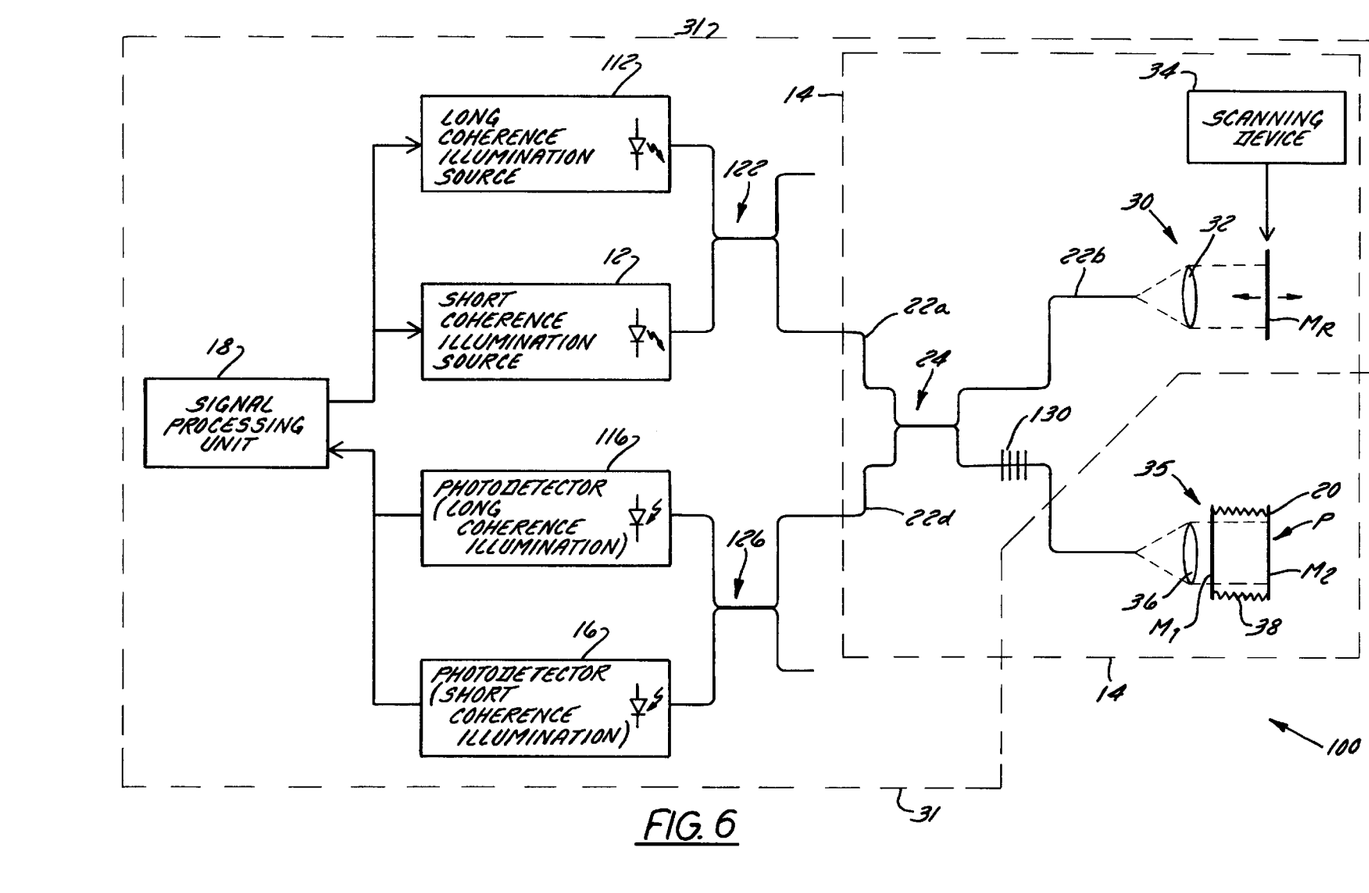
FIGS. 6–7 are schematic view of alternative embodiments of self-referencing, interferometric optic sensor systems according to the present invention.

Referring now to FIG. 6, an alternative embodiment of a sensor system according to the present invention is illustrated. In the sensor system 100 of FIG. 6, an additional illumination source 112 and an additional photodetector 116 are provided that are used to monitor the change in the position of the mirror $M_R$. In conjunction with the additional illumination source 112 and the additional photodetector 116, a coupler 122 and a dispersive element 126 are provided. The remaining elements of the system 100 are the same as in the system 10, and therefore the operation of the remaining elements will not be described further except as related to the additional elements.

The illumination source 112 is a long coherence length illumination source and produces light at a wavelength that is not within the spectrum of the illumination source 12. A long coherence length illumination source in the present context is an illumination source that has a coherence length which is at least as long as the maximum scanning range of the reference mirror $M_R$, and longer than the maximum separation of mirrors $M_1$ and $M_2$. The illumination source 112 may, for example, be a distributed feedback laser.

The light produced by the illumination source 112 is coupled with light produced by the illumination source 12 at the coupler 122, so that light from both illumination sources travels in the optical fiber 22a. The optical coupler 24 again splits the light from the illumination source 112 into two preferably equal portions. A first portion of the light travels through the optical fiber 22b and is delivered to the reference mirror assembly 30. A second portion of the light travels through the optical fiber 22c to a reflector that is disposed along the optical fiber 22c.

Preferably, the reflector is formed of a fiber grating 130 (such as a Bragg grating) that (1) is disposed along the optical fiber 22c at a particular location and (2) is provided with a grating constant which causes the fiber grating 130 to be reflective at the wavelength of the long coherence illumination source and to be otherwise transmissive. As is known, a Bragg grating comprises a periodic or semi-periodic refractive index structure recorded in the core of an optical fiber. In the refractive index structure, the effective index of refraction is modulated at a given frequency (defined by a grating constant) along the length of the optical fiber. At a particular wavelength of the light, the period of the refractive index structure corresponds to the wavelength of the light guided in the optical fiber. Consequently, a resonance condition which is thereby created causes the light to reflect backwards. Of course, the reflector could also be formed of another structure. As detailed below, for example, the reflector could also be formed of a combination of the mirrors $M_1$ and $M_2$.

At the optical coupler 24, the light reflected from the reference mirror $M_R$ constructively and destructively interferes with the light reflected from the fiber grating 130. It may be noted that interference occurs even though the optical path length of the light that travels through the optical fiber 22b is significantly longer than the optical path length of the light that travels through the optical fiber 22c. This, of course, is due to the fact that the illumination source 112 is a long coherence length illumination source.

A portion of the interference light travels to the dispersive element 126. The dispersive element 126 could be any structure that separates light on the basis of wavelength. For example, the dispersive element 126 could be a wavelength division multiplexer, a dispersive coupler, an arrangement of filters, or a dichroic mirror.

As previously noted, the light produced by the illumination source 112 is at a wavelength that is not within the spectrum of the illumination source 12. Accordingly, the dispersive element 126 separates the two interference signals traveling through the optical fiber 22d on the basis of wavelength, such that interference produced using light from the illumination source 12 is directed to the photodetector 16 and interference produced using light from the illumination source 112 is directed to the photodetector 116.

The photodetector 116 detects the interference produced using light from the source 112, and provides an output that is indicative of sensed intensity. This output is provided to the signal processing unit 18, which then interprets the interference to thereby monitor the movement of the reference mirror $M_R$.

The interference produced using light from the illumination source 112 is interpreted to monitor the movement of the reference mirror $M_R$ in the following manner. Each interference fringe (consisting of one interference maximum and one interference minimum, i.e., one high intensity region and one low intensity region of the interferogram) corresponds to movement of the mirror $M_R$ equaling $\lambda/2$ (where $\lambda$ is the wavelength of the illumination source 112). Therefore, by counting interference fringes, the total displacement of the reference mirror $M_R$ between the zero optical path difference position for the mirror $M_1$ and the zero optical path difference position for the mirror $M_2$ can be determined. Advantageously, since movement of the mirror $M_R$ of a fraction of the wavelength of the illumination source 112 can be detected, this arrangement provides a high precision mechanism for monitoring the movement of the reference mirror $M_R$ which can be implemented without using an expensive, high precision mechanical device in association with the scanning device 34.

When the combination of the mirrors $M_1$ and $M_2$ is used as a composite reflector, the light reflected from the mirror $M_1$ and the light reflected from the mirror $M_2$ form a composite reflection that includes interference between the light reflected from the two mirrors $M_1$ and $M_2$. The composite reflection then interferes with the light reflected from the reference mirror $M_R$ in the manner previously described in conjunction with the fiber grating 130. In order to prevent the possibility that light reflected from the mirror $M_1$ cancels out light reflected from the mirror $M_2$, the mirrors $M_1$ and $M_2$ are provided with reflectivities which cause the intensity of the light reflected by each mirror to be different.

It should be noted that the use of the fiber grating 130 is preferred over the use of the mirrors $M_1$ and $M_2$, since the intensity of the light reflected from the fiber grating 130 is not affected by the movement of the mirror $M_2$. Light reflected from the fiber grating 130 is generally not affected by disturbances which cause the optical path length of the optical fiber 22c to vary if the grating is located close to the optical coupler 24.

Figure 7:
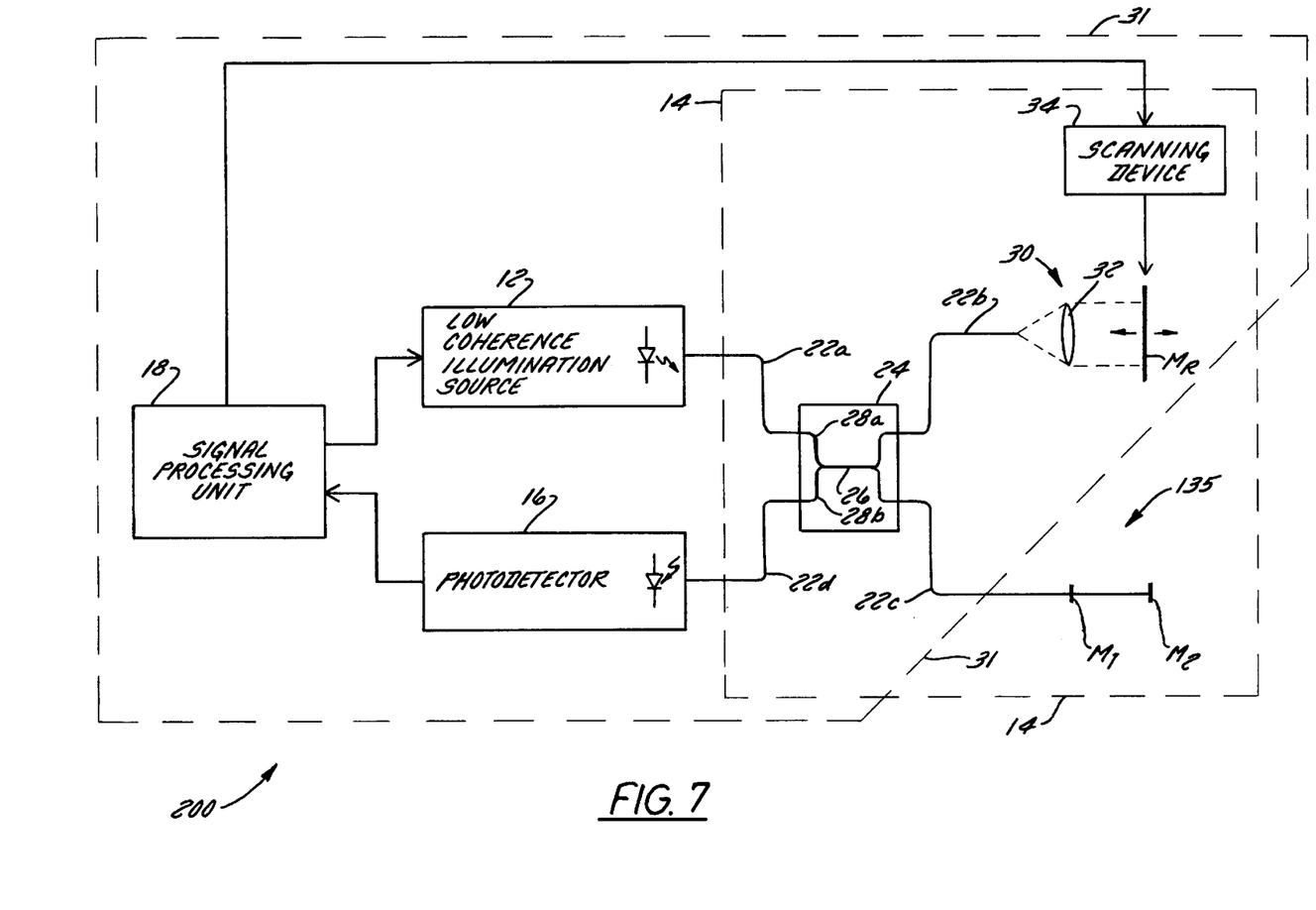

Referring now to FIG. 7, another preferred embodiment of the invention is illustrated. The sensor system 200 of FIG. 7 is generally the same as the sensor system 10 of FIG. 1, except that a test mirror assembly 135 has been provided which measures a parameter other than pressure. As is known, optical path distance (or length) is equal to the index of refraction of an optical medium integrated over the distance traveled by the light through the medium. Thus, in the embodiment of FIG. 7, the mirror $M_2$ is preferably fixed and the index of refraction of the material which is disposed between the mirrors $M_1$ and $M_2$ varies in accordance with a sensed parameter. The transducer mechanism in this embodiment therefor comprises the mirror $M_2$ and the material that is disposed between the mirrors $M_1$ and $M_2$. For example, the mirrors $M_1$ and $M_2$ may be formed of Bragg gratings recorded along the optical fiber 22c, and the portion of the optical fiber 22c that is between the mirrors $M_1$ and $M_2$ may be exposed to temperature variations or to external chemical media of varying refractive index which cause the index of refraction of this portion of the optical fiber 22c to vary. As the index of refraction of this portion of the optical fiber 22c varies, the optical path length difference between the reference mirror $M_R$ and the mirror $M_2$ varies, and this variation is detected in the previously described manner in order to determine the value of the sensed parameter. The provision of the mirror $M_1$ again causes the sensor system 200 to be self-referencing, so that disturbances which occur between the coupler 24 and the mirror $M_1$ appear in the reflections from both the mirror $M_1$ and the mirror $M_2$ and therefore cancel out.

Advantageously, therefore, the sensor system is self-referencing. The provision of an additional test reflector provides a reference for measuring the optical path length difference between the test reflector and the reference reflector. This makes the sensor relatively insensitive to variations in temperature, vibrations, optical fiber bending, and variations in refractive indices between the test and reference paths. Disturbances caused by such variations tend to cancel, because they show up in two different measurements that are then subtracted.

Moreover, a pressure sensor system according to the invention allows absolute measurements of the position of a test mirror forming the transducer surface to be made. No knowledge regarding the previous position of the test mirror is required.

Finally, the pressure sensor system enjoys advantages over other, non-fiber optic pressure sensor systems. For example, the pressure sensor system is generally safer than electrical pressure sensor systems (such as capacitive systems) because the transducer mechanism is incapable of causing spark-induced fires or explosions. Additionally, the pressure sensor system enjoys extremely high precision while at the same time having a large dynamic range.

Many other changes and modifications may be made to the present invention without departing from the spirit thereof. The scope of these and other changes will become apparent from the appended claim.

We claim:

1. A method of sensing a parameter by sensing changes in an optical path length, the method comprising:

(A) acquiring a first interferogram, the first interferogram being produced by the interference of light reflected from a first reflector with light reflected from a reference reflector, the first reflector being a position reference against which the optical position of a second reflector is compared;

(B) acquiring a second interferogram using a transducer mechanism that includes the second reflector, the second interferogram being produced by the interference of light reflected from the second reflector with light reflected from the reference reflector, the transducer mechanism exchanging energy with a system under test in accordance with variations in the sensed parameter to vary the optical position at which the second interferogram is detected, and the transducer mechanism thereby causing the optical path length difference between the second reflector and the reference reflector to vary in accordance with the variations in the sensed parameter;

(C) using the first and second interferograms to determine an optical path length between the first and second reflectors; and (D) using the optical path length between the first and second reflectors to determine the absolute value of the sensed parameter.

2. A method as defined in claim 1, wherein the method further comprises (1) providing an interferometric fiber optic sensor system comprising an illumination source, a photodetector, and an interferometer including (a) the first and second reflectors, (b) the reference reflector, (c) a coupler, (d) a first optical fiber that optically couples the illumination source and the coupler, (e) a second optical fiber that optically couples the coupler and the reference reflector, (f) a third optical fiber that optically couples the coupler and the first and second reflectors, and (g) a fourth optical fiber that optically couples the coupler and the photodetector; and (2) producing the first and second interferograms using the illumination source and the interferometer; and wherein the first and second interferograms are acquired using the photodetector.

3. A method as defined in claim 2, wherein the interferometric fiber optic sensor system is provided such that (1) the illumination source, the photodetector, and the reference reflector are located together and are located at a local end of the third optical fiber, and (2) the first and second reflectors are located together and are located at a remote end of the third optical fiber.

4. A method as defined in claim 2, wherein the interferometric fiber optic sensor system is provided such that (1) the illumination source, the photodetector, and the reference reflector are located in a first common housing, and (2) the first and second reflectors are located in a second common housing.

5. A method as defined in claim 2, wherein the producing step includes varying the optical path length between the optical coupler and the reference mirror.

6. A method as defined in claim 5, wherein the varying step includes moving the reference mirror.

7. A method as defined in claim 5, wherein the varying step includes varying an index of refraction along at least a portion of an optical path between the coupler and the reference reflector, the index of refraction being varied using at least one of photoelastic effects, acousto-optic effects, and electro-optic effects.

8. A method of sensing a parameter by sensing changes in an optical path length, the method comprising:

(A) providing an interferometric fiber optic sensor system comprising an illumination source, a photodetector, and an interferometer including (a) the first and second reflectors, (b) the reference reflector, (c) a coupler, (d) a first optical fiber that optically couples the illumination source and the coupler, (e) a second optical fiber that optically couples the coupler and the reference reflector, (f) a third optical fiber that optically couples the coupler and the first and second reflectors, and (g) a fourth optical fiber that optically couples the coupler and the photodetector;

(B) producing the first and second interferograms using the illumination source and the interferometer;

(C) acquiring a first interferogram using the photodetector, the first interferogram being produced by the interference of light reflected from the first reflector with light reflected from the reference reflector;

(D) acquiring a second interferogram using the photodetector, the second interferogram being produced by the interference of light reflected from the second reflector with light reflected from the reference reflector, the optical path length difference between the second reflector and the reference reflector varying in accordance with the sensed parameter, the sensed parameter being a pressure detected by the second reflector, and the second reflector being movably mounted within the interferometer by way of a spring mechanism having a spring constant;

(E) using the first and second interferograms to determine an optical path length between the first and second reflectors; and (F) using the optical path length between the first and second reflectors to determine the value of the sensed parameter, including determining the pressure based on the spring constant and the optical path length between the first and second reflectors.

9. A method as defined in claim 2, wherein the second reflector is fixedly mounted with respect to the first reflector;

wherein the optical path length difference between the second reflector and the reference reflector varies as a result of variations in the index of refraction of an optical medium disposed between the first and second reflectors; and wherein the index of refraction of the optical medium disposed between the first and second reflectors varies in accordance with the sensed parameter, the variations in the index of refraction causing the variations of the optical path length difference between the second reflector and the reference reflector.

10. A method as defined in claim 9, wherein the sensed parameter is temperature.

11. A method as defined in claim 9, wherein the sensed parameter is the composition of a chemical media.

12. A method as defined in claim 2, wherein the sensed parameter is displacement.

13. A method as defined in claim 2, wherein the photodetector is a first photodetector;

wherein a long coherence illumination source and a second photodetector are also provided during the providing step, the long coherence length illumination source being coupled to the coupler by way of the first optical fiber;

wherein the step of producing the first and second interferograms includes varying the optical path length between the optical coupler and the reference mirror by moving the reference reflector; and wherein the method further includes
  (1) producing a third interferogram using long coherence length light produced by the long coherence length illumination source and reflected from the reference reflector,
  (2) acquiring the third interferogram using the second photodetector, and
  (3) using the third interferogram to monitor the movement of the reference reflector.

14. A fiber optic sensor system comprising:

(A) a low coherence length illumination source;

(B) a first optical fiber;

(C) a coupler, the coupler being coupled to the low coherence length illumination source by way of the first optical fiber;

(D) a second optical fiber;

(E) a reference reflector, the reference reflector being coupled to the coupler by way of the second optical fiber;

(F) a third optical fiber;

(G) a position reference comprising a first test reflector, the first test reflector being coupled to the coupler by way of the third optical fiber, an optical path length difference between the first reflector and the reference reflector being substantially insensitive to variations in a sensed parameter thereby permitting the first reflector to be a position reference against which the optical position of a second reflector is compared;

(H) a transducer mechanism comprising the second test reflector, the second test reflector being coupled to the coupler by way of the third optical fiber, the transducer mechanism exchanging energy with a system under test in accordance with variations in the sensed parameter to vary the optical position of the second reflector, and the transducer mechanism thereby causing an optical path length difference between the second test reflector and the reference reflector to vary in accordance with variations in the sensed parameter;

(I) a fourth optical fiber;

(J) a photodetector, the photodetector being coupled to the coupler by way of the fourth optical fiber; and (K) a signal processing unit that is electronically coupled to the photodetector and that determines the absolute value of the sensed parameter by determining an optical path length between the first and second test reflectors.

15. A system as defined in claim 14, wherein the photodetector acquires first and second interferograms, the first interferogram being produced using light reflected from the first test reflector and the reference reflector and the second interferogram being produced using light reflected from the second test reflector and the reference reflector; and wherein the signal processing unit uses the first and second interferograms to determine the optical path length between the first and second test reflectors.

16. A system as defined in claim 15, wherein the second test reflector is movable in accordance with a pressure, and wherein the sensed parameter is the pressure.

17. A system as defined in claim 16, further comprising a spring mechanism having a spring constant, and wherein the signal processing unit determines the pressure on the basis of a spring constant and the optical path length between the first and second reflectors.

18. A system as defined in claim 15, wherein the second reflector is fixedly mounted with respect to the first reflector;

wherein the optical path length difference between the second reflector and the reference reflector varies as a result of variations in the index of refraction of an optical medium disposed between the first and second reflectors; and wherein the index of refraction of the optical medium disposed between the first and second reflectors varies in accordance with the sensed parameter, the variations in the index of refraction causing the variations of the optical path length difference between the second reflector and the reference reflector.

19. A system as defined in claim 18, wherein the sensed parameter is temperature.

20. A system as defined in claim 18, wherein the sensed parameter is the composition of a chemical media.

21. A system as defined in claim 15, wherein the sensed parameter is displacement.

22. A system as defined in claim 15, wherein the photodetector is a first photodetector;

wherein the reference reflector is movable;

wherein the system further comprises
  (1) a long coherence length illumination source, the long coherence length illumination source being coupled to the coupler by way of the first optical fiber,
  (2) a second photodetector, the second photodetector acquiring a third interferogram produced using long coherence length light reflected from the reference reflector, and wherein the signal processing unit uses the third interferogram to monitor the movement of the reference reflector.

23. A system as defined in claim 15, wherein the illumination source, the photodetector, and the reference reflector are located together and are located at a local end of the third optical fiber; and wherein the first and second reflectors are located together and are located at a remote end of the third optical fiber.

24. A system as defined in claim 15, wherein the illumination source, the photodetector, and the reference reflector are located in a first common housing;

wherein the first and second reflectors are located in a second common housing.

25. A fiber optic pressure sensor system comprising:

(A) a low coherence length illumination source;

(B) a first optical fiber;

(C) a coupler, the coupler being coupled to the low coherence length illumination source by way of the first optical fiber;

(D) a second optical fiber;

(E) a reference reflector, the reference reflector being coupled to the coupler by way of the second optical fiber;

(F) a third optical fiber;

(G) a first test reflector, the first test reflector being coupled to the coupler by way of the third optical fiber, the first test reflector being semi-transparent, the first test reflector receiving a first portion of light emitted by the third optical fiber and reflecting the first portion of the light back to the third optical fiber;

(H) a second test reflector, the second test reflector being coupled to the coupler by way of the third optical fiber, the second test reflector receiving a second portion of light emitted by the third optical fiber and reflecting the second portion of the light back to the third optical fiber, the second test reflector being longitudinally movable with respect to the first test reflector, the second test reflector detecting a pressure, and the second test reflector being spaced from the first test reflector by a distance that varies according to the pressure detected by the second test reflector, an optical path length difference between the second test reflector and the reference reflector varying in accordance with the detected pressure;

(I) a fourth optical fiber;

(J) a photodetector, the photodetector being coupled to the coupler by way of the fourth optical fiber, the photodetector acquiring first and second interferograms, the first interferogram being produced using light reflected from the first test reflector and the second interferogram being produced using light reflected from the second test reflector; and (K) a signal processing unit that is electronically coupled to the photodetector and that determines the value of the sensed parameter by determining an optical path length between the first and second test reflectors, the optical path length between the first and second test reflectors being determined using the first and second interferograms.

26. A system as defined in claim 25, wherein the photodetector is a first photodetector;

wherein the reference reflector is movable;

wherein the system further comprises (1) a long coherence length illumination source, the long coherence length illumination source being coupled to the coupler by way of the first optical fiber, (2) a second photodetector, the second photodetector acquiring a third interferogram produced using long coherence length light reflected from the reference reflector, and wherein the signal processing unit uses the third interferogram to monitor the movement of the reference reflector.

* * * * *